United States Patent
Pine

(10) Patent No.: US 6,993,210 B1
(45) Date of Patent: Jan. 31, 2006

(54) IMAGING SYSTEM HAVING ADAPTIVE CLOCKING IN RESPONSE TO PROCESSING STATE

(75) Inventor: Joshua I. Pine, Seal Beach, CA (US)

(73) Assignee: ESS Technology, Inc., Fremont, CA (US)

( * ) Notice: Subject to any disclaimer, the term of this patent is extended or adjusted under 35 U.S.C. 154(b) by 554 days.

(21) Appl. No.: 09/815,584

(22) Filed: Mar. 23, 2001

(51) Int. Cl.
 *G06K 9/60* (2006.01)

(52) U.S. Cl. .................. 382/303; 382/307; 713/500

(58) Field of Classification Search ........... 382/251, 382/302, 303, 304, 307, 232, 239, 233, 235, 382/254, 144, 168, 276, 294, 305, 312; 375/239, 375/240.1, 240.02, 240.03, 240.28, 240.2; 713/400, 500, 600; 348/714, 715, 718, 554, 348/159, 370, 553; 380/217
See application file for complete search history.

(56) References Cited

U.S. PATENT DOCUMENTS

| | | | | |
|---|---|---|---|---|
| 4,198,656 A | * | 4/1980 | Mathisen | 348/159 |
| 5,724,475 A | * | 3/1998 | Kirsten | 386/109 |
| 6,202,165 B1 | * | 3/2001 | Pine | 713/500 |
| 6,252,850 B1 | * | 6/2001 | Lauret | 370/235 |
| 6,271,884 B1 | * | 8/2001 | Chung et al. | 348/370 |
| 6,490,000 B1 | * | 12/2002 | Schaefer et al. | 348/553 |
| 6,661,846 B1 | * | 12/2003 | Ota | 375/240.28 |
| 6,714,260 B1 | * | 3/2004 | Pine | 348/724 |

* cited by examiner

*Primary Examiner*—Bhavesh M. Mehta
*Assistant Examiner*—Seyed Azarian
(74) *Attorney, Agent, or Firm*—Farjami & Farjami LLP

(57) ABSTRACT

An imaging system that can adaptively clock the component subsystems based upon the processing schedules of these subsystems is disclosed. Additionally, disclosed is an adaptively enabled multi-processor system based upon these processing schedules.

26 Claims, 11 Drawing Sheets

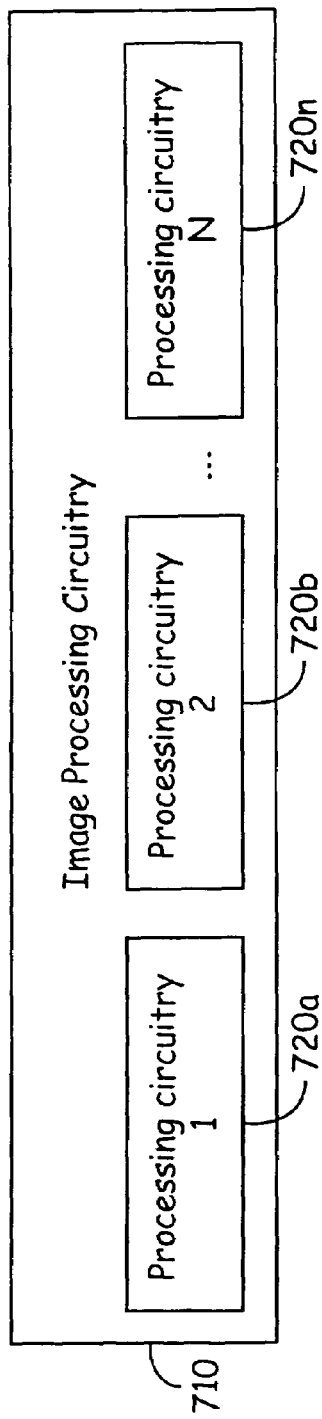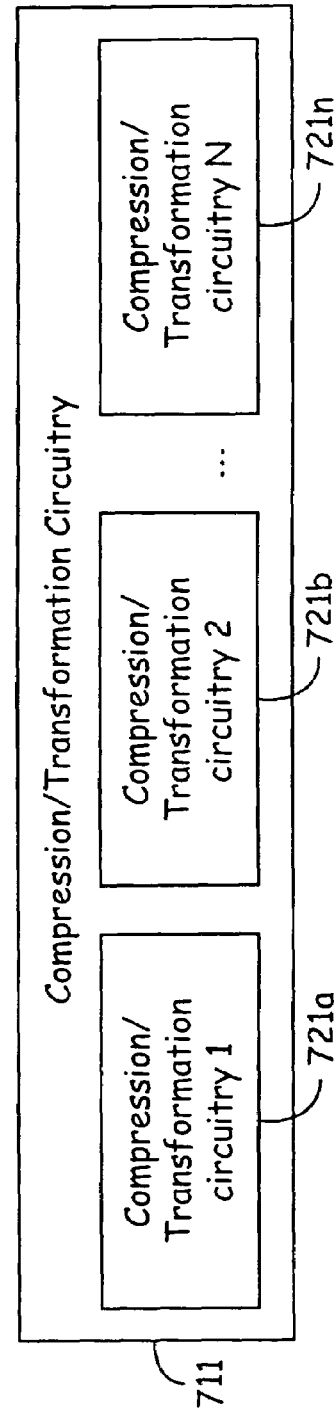
Fig. 7a
Fig. 7b

IMAGING SYSTEM HAVING ADAPTIVE CLOCKING IN RESPONSE TO PROCESSING STATE

BACKGROUND OF THE INVENTION

1. Technical Field

The invention is directed to an imaging system contained in an electronic imager. More specifically, this invention is directed to an imaging system that is adaptively clocked based on a processing schedule.

2. Related Art

Many conventional imaging systems contain a lensing system, through which light passes and strikes an image sensor. The image sensor transforms the incident light into a readable signal that is then processed by interface circuitry. The interface circuitry usually contains functionality for performing row and column scanning of the individual image sensors, an analog to digital ("A/D") conversion of the signals produced by the image sensors, and some pre-processing circuitry that stores the scanned signals into a simple array.

Typically, the raw image data is then processed by image processing circuitry, which may include a DC restoration, interpolation of pixel data, and image-enhancement processing steps. In addition, in preparation for storage, compression is usually performed on the processed image data. After the processed image data is compressed, the final image data may be stored in a long term storage device or pass to a communication interface for transfer to an external environment. The image processing circuitry usually performs these steps at a much slower rate than the combination of the lensing system, the image sensor circuitry, and the interface circuitry can provide the scanned signals of an image.

Thus, to prevent loss of image data, the capture and preprocessing of images must occur no faster than the post-processing rate. In general, the clocking of the imaging system can only be as fast as the slowest sub-system in the sequential chain of image capture and processing.

This timing discrepancies may also occur between the image processing circuitry and the compression circuitry. Thus, any differences in the timing of the passage of image data between the capture and interface circuitry, between the interface circuitry and the image processing circuitry, and/or between the imaging processing circuitry and the compression circuitry, can create otherwise unnecessary delays in the operation of a typical imager or imaging system.

Moreover, to accommodate one subsystem's processing requirements, a faster and higher power consuming processing unit or circuitry may be selected. Such processing unit or circuitry may be used for multiple sub-system processing at such faster rate which may be unnecessary at times and may utilize higher power than would otherwise be required.

SUMMARY

Various aspects of the invention can be found in an imaging system comprising imaging circuitry that includes an image sensing circuit, an image processing circuit and a transformation circuit, where the processing status of any one of these circuits alters the timing of at least one of the other circuits. The image sensing circuitry produces raw image data, the image processing circuitry processes the raw image data into processed data and the transformation circuitry transforms the processed image data into final image data. The imaging system may also include an intermediate storage queue that stores the image data and modifies the timing of at least one of the imaging circuits. The image processing circuitry, the image sensing circuitry and the transformation circuitry can be enabled to a faster speed or slower speed depending on a pre-determined threshold of image data in the intermediate storage queue.

In other embodiments of the invention, the electronic imager performs processing on an acquired image and comprises a plurality of functional processing circuits, the functional processing circuits comprising an acquisition circuit that produces signals in response to incident light from an acquired image, an interface circuit that produces a raw image data set from the signals collected by the acquisition circuit, a processing circuit that produces a processed image data set from the raw image set and an intermediate image storage buffer that stores one or more image data sets. Again, one or more of the plurality of functional processing circuits alters its operating speed in response to the amount of image data sets contained in the intermediate storage buffer. The processing circuitry and the acquisition circuitry can be enabled to a faster speed or slower speed depending on predetermined thresholds of raw image data or processed image data in the intermediate storage queue. The imager may include transformation circuitry that produces a final image data set from a processed image data set.

Further aspects of the present invention can be found in a method of operating an imaging system, where the method comprises acquiring an initial image in the image sensor, producing a first image data from the initial image in the interface circuitry, processing the first image data into second image data in the image processing circuitry, selectively storing either the first or second image data in a buffer and selectively altering the speed at which one of the functional imaging circuits operates in response to the amount of image data in the buffer. The method may include processing the second image data into final image data in a transformation circuit. The speeds of the transformation circuit, the processing circuit or the interface circuit may be accelerated or decelerated when the intermediate storage queue contains more or less than a pre-determined level of processed image data.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 7 is a schematic block diagram of a possible embodiment of the image processing circuit according to FIG. 1.

DETAILED DESCRIPTION

Figure 1:
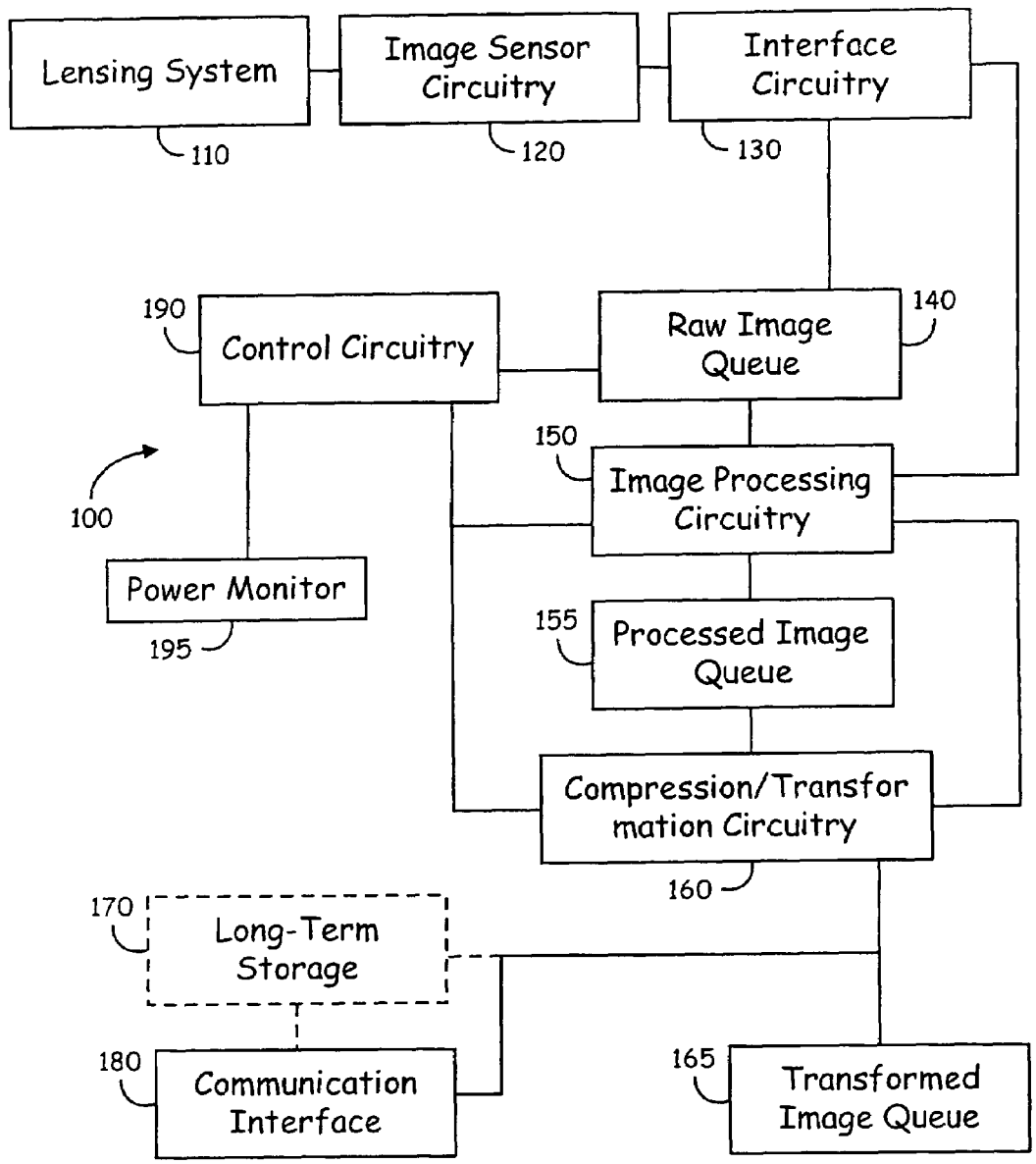
FIG. 1 is a schematic block diagram of an imaging system.

FIG. 1 is a schematic block diagram of an imaging system 100. An imaging system 100 contains functional imaging circuits of: a lensing system 110, an image sensor circuit 120, and an interface circuit 130, an image processing circuit. The functional imaging circuits may also include a compression/transformation circuit 160 and communication or storage circuitries 170 and 180. The lensing system 110, the image sensor circuitry 120, and the interface circuitry 130 form an image acquisition system for the imaging system 100.

Light from the external environment enters the digital imaging system 100 through the lensing system 110 and falls upon the image sensor circuitry 120. The image sensor circuitry 120 detects the light falling onto it through the lensing system 110. The lensing system 110 may be automatically adjusted, for example, for aperture or exposure time in response to signals from an image control circuit 190.

The image sensor circuitry 120 produces a signal or signals representative of the light impinging on it, which signal is then passed through to the interface circuitry 130. The interface circuitry 130 may modify the signals produced by the individual sensors contained within the image sensor circuitry 120 to be compatible with the imaging system 100.

The image sensor circuitry 120 typically contains a plurality of pixel sensors in array form. More specifically, the image sensor circuitry 120 is usually comprised of a plurality of individual light detection elements arranged to capture an image. In most imagers, these elements contain photosensitive diodes formed on a semiconductor substrate. Each individual light detection element measures an amount of light corresponding to the pixel components of the overall image.

For black and white recordings of images, the pixel data represents the physical gray scale shade of a corresponding image. For color recordings, a widely known tri-chromatic color scheme RGB is used, where a triplet of pixels represents the appropriate amounts of the colors red (R), green (G), and blue (B) of a single minute portion of the image. The pixel elements of each set are typically located adjacent to each other on the display device, so that when shown simultaneously, the elements appear to form the actual colors of the original image.

For example, in the commonly known Bayer pattern, the individual light detection elements are arranged in a plane where each light detection element for red or blue is adjacent to a light detection element for green. The RGB triplet in such a pattern may be interpolated and then effectively estimated for each pixel location by computing two of the three color components in the neighboring light detection elements.

The imaging system 100 directs the collection of the individual pixels through an array of image sensors in the image sensor circuitry 120. The results obtained by each image sensor in the image sensor circuitry 120 are read by the interface circuitry 130 of the imaging system 100.

The interface circuitry 130 transforms the signals present on the individual image sensors of the image sensor circuitry 120 to formats consistent with internal use by the imaging system. Thus, the digital representations of the complete images are effected by the interface circuitry 130. The interface circuitry 130 then delivers the raw images to an image processing circuit 150.

The raw image data acquired by the imaging system 100 is then sent to an image processing circuit 150. The imaging processing circuitry 150 performs other imaging functions on the raw image data provided by the interface circuitry 130. These functions may include various forms of bias control, contrast control, filtering, or other types of image enhancement. The image data may be preliminarily compressed via a compression or transformation circuit 160.

A raw image queue 140 is present, which contains memory for the storage of raw image data provided by the interface circuitry 130. In the event that the interface circuitry 130 makes an image available to the processing circuitry 150 at a time when the imaging processing circuitry 150 is unavailable for processing the image data, the raw image data may be stored in the raw image queue 140. Accordingly, the image processing circuitry 150 may operate on the raw image data placed in the raw image queue 140 at a later time.

The imaging processing circuitry 150 transforms the raw image data provided by the interface circuitry 130 into a processed image. The processed image data is made available to a compression or transformation circuit 160. In order to ease the burden of transmission or storage, the transformation or compression circuitry 160 can compress the processed image data from the image processing circuitry 150 by a factor of 50 to 60. The compression circuitry 160 can also transform the processed image data from the image processing circuitry 150 into more compatible formats as necessary.

If the processed image data from the image processing circuitry 150 cannot be sent directly to the compression or transformation circuitry 160, a processed image queue 155 is available to store the processed image data from the image processing circuitry 150. In the event that the compression or transformation circuitry 160 operates at a slower speed than the image processing circuitry 150, the processed images can be placed into the processed image queue 155, thereby allowing the image processing circuitry 150 to perform additional tasks in the interim.

If the amount of data in the raw image queue 140 approaches a critical threshold, the raw image queue 140 may indicate this to the imaging system 100 through the control circuit 190. Thus, the status of the raw image queue 140 may be used by the imaging system 100 to slow down, but not stop, the speed at which raw images are captured by the lensing system 110, the image sensor circuitry 120 and the interface circuitry 130. Or, if the raw image queue 140 reaches a critical state at which no further images may be stored in the queue, this state may indicate to the imaging system 100 that the process of capturing raw images should be stopped. Thus, the imaging system 100 provides adaptive clocking in response to a given processing state.

First, the collection of the raw images is slowed when an initial critical threshold is exceeded in raw image queue 140, then halted altogether if further conditions so dictate. At the stage at which the collection of raw images is slowed, it should be noted that the collection of raw image data by the lensing system 110, the image sensor circuitry 120, and the interface circuitry 130, is not terminated.

Thus, in contrast to previous imaging systems in which critical data would be lost at the first conflict between the collection of data from the lensing system 110, the image sensor circuitry 120, the interface circuitry 130, and the processing activities in the image processing circuitry 150, no such data is lost in the imaging system as described herein.

A control circuit 190 may be coupled to the interface circuitry 130, the raw image queue 140, the image processing circuitry 150, the compression or transformation circuitry 160, the processed image queue 155, or the communication interface 180. In this manner, the imaging can detect the conditions for the operation of the intermediate storage queues or buffers, and operably interface with the components.

Additional timing problems may arise in later stages of the processing of images through the imaging system 100. For example, after the image data is processed by the image processing circuitry 150, further compression of the image data may be necessary. Or, additional transformation of the image data from the image processing circuitry may be necessary to transform the captured image data from a proprietary format into a more common format.

Accordingly, the processed data may be passed from the image processing circuitry 150 to a compression or transformation circuitry 160. If the image processing circuitry 150 operates at a different speed than the compression or transformation circuitry 160, similar timing bottlenecks may again arise. If data is to be passed from the image processing circuitry 150 to the compression or transformation circuitry 160 while the compression or transformation circuitry 160 is still operating on previous data, additional problems may occur.

In this instance, the imaging system 100 may direct the image processing circuitry 150 to store the processed image in a processed image queue 155 in a manner similar to the storage process noted above. Once again, if the processed image queue reaches a specified critical threshold of holding processed images awaiting compression or transformation, the imaging system 100 may direct the image processing circuitry 150 to slow down processing of the image data to allow the compression or transformation circuitry 160 to recover and regain timing alignment with the rest of the imaging system circuitry. Slower clocking of image processing circuitry 150 may then effect slower clocking of the images captured by the lensing system 110, the image sensor circuitry 120, and the interface circuitry 130.

The compression or transformation circuitry 160 makes the final image data available to an external environment through a communication interface 180. Conversely, the compression circuitry 160 may also store final processed images in a long-term storage device 170. The long-term storage device 170 may, for example, be magnetic media, memory sticks such as commonly found in digital cameras, or replaceable electronic media. The long-term storage device 170 may exist external to the imaging system 100, with communication taking place between the compression or transformation circuitry 160 and the long-term storage device 170 over any form of communication network, including, for example, the Internet.

Transmission speed to external storage can be significantly enhanced by data file compression. Lossless compression methods can compress an image data file by about fifty percent on average. Typically, greater compression is required. Many methods exist to achieve such compression rates and are commonly used, but result in a significant loss of information and a significant increase in processing time. As such, the compression circuitry may involve a significant risk of blockage to the rest of the imaging system 100.

The final processed images may be sent to the external environment from the long-term storage device 170 through the communication interface 180. The communication interface 180 may be a parallel or serial port interface, a modem connection through a telephone line, a serial communications device, a wired network adapter, a wireless transceiver, a Universal Serial Bus (USB) port, or an SCSI interface, to name just a few.

Any one of the raw image queue 140, the processed image queue 155, the image processing circuitry 150, or the compression or transformation circuitry 160 may be implemented as specialized circuitry or through the use of a generic software processor. Any combination of hardware and software may be used to implement any of these components.

Figure 2:
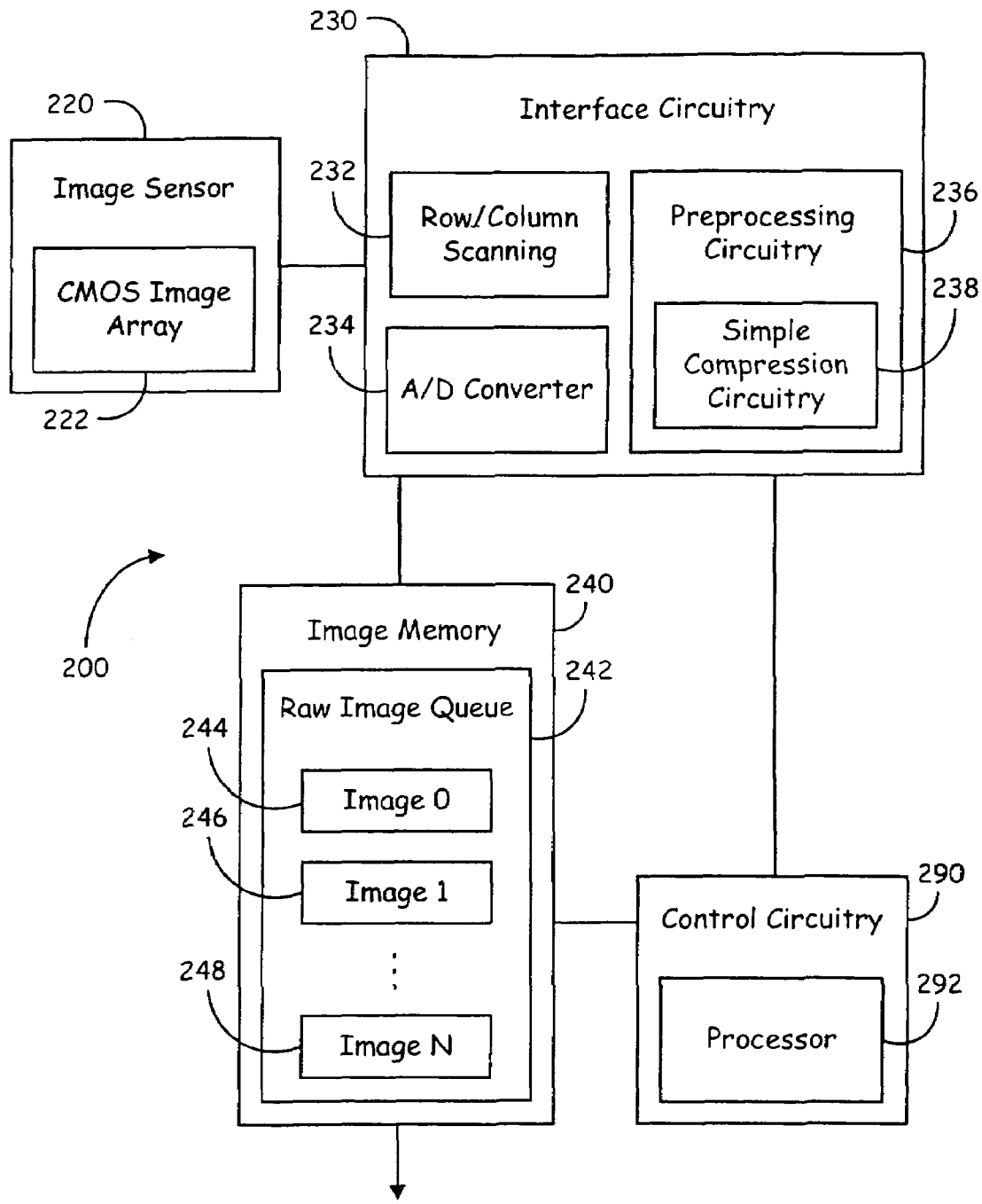
FIG. 2 is a schematic block diagram of embodiments of the image sensor circuitry, the interface circuitry, and the raw image queue of FIG. 1.

FIG. 2 is a schematic block diagram of embodiments of the image sensor circuitry, the interface circuitry, and the raw image queue of FIG. 1. In an imaging system 200, incident light striking the image sensor 220 is converted to an electrical signal to be transmitted to an interface circuit 230 that transforms the electrical signal into an image data signal. The image sensor 220 typically comprises a semiconductor optical sensing device, such as a Complementary Metal Oxide Semiconductor ("CMOS") image array 222, for example. Other semiconductor imaging devices may be used in the imaging system 200, including a charge coupled device ("CCD"), or other opto-electrical devices. The image sensor 220 is typically an array of semiconductor-based image sensors.

Each image sensor provides an electrical value representative of the intensity of light incident upon the sensor. The interface circuit 230 converts the signal from the image sensor 220 into a signal compatible with the operation of the imaging system 200. Typically the interface circuitry 230 contains additional elements to aid in this process, including a row/column scanning circuit 232, an analog-to-digital ("A/D") converter circuit 234, and a simple pre-processing circuit 236. The row/column scanning circuitry 232 scans all of the elements in the image sensor 220. The row/column scanning circuitry 232 ensures that all of the imager elements of the image sensor 220 are read in order to obtain a full image.

The A/D converter circuitry 234 transforms the signal from the image sensor elements contained in the image sensor 220 into a signal compatible with the operation of the imaging system 200. As such, an individual signal produced by an individual sensor element in the image array 222 is read in turn by the row/column scanning circuitry 232 and then converted into a digital format by the A/D converter circuitry 234. After all of the individual image sensor elements of the image array 222 are read, a digital representation of the captured image is now available via the interface circuitry 230.

In order to improve upon the speed and size constraints of the imaging system 200, the interface circuitry 230 may contain a pre-processing circuit 236. This pre-processing circuitry may perform simple operations on the image data collected by the interface circuitry 230. For example, the pre-processing circuitry may contain a simple compression circuit 238, which can reduce the size of the image collected by the interface circuitry 230 for further operations or for ease of transfer.

After the images are collected from the image sensor 220 and the interface circuitry 230, the raw image data is then ready for further processing by the imaging system 200. But, if additional processing elements in the imaging system 200 are not presently available, this condition will be noted by a control circuit 290. The control circuit may detect that additional data is available and direct that the processing circuit clock up or the interface circuitry clock down. In this instance, the control circuit 290 would indicate to the interface circuitry 230 that the raw image data is to be stored in an intermediate storage queue or buffer until such processing elements become available, and that the timing characteristics of the functional imaging elements be altered to deal with the situation.

The raw image data would then be transferred to an image memory 240. The image memory 240 contains a raw image queue 242, which itself contains memory slots for the storage of raw image data. For example, if the interface circuitry 230 learns from the control circuitry 290 that further processing may not presently be performed on the collected data, the data would be transferred to the raw image queue 242.

Upon receipt of the raw image data from the interface circuitry 230, the raw image queue 242 would store the raw image data in the raw image queue 242 in a corresponding slot "Image 0" 244 for a first image. Correspondingly, when the next image was obtained by the digital imager 200 through the image sensor 220 and the interface circuitry 230, this image would again be transferred to the image memory 240. The image memory 240 then would place the data corresponding to the next obtained image into the raw image queue 242 at a slot "Image 1" 246.

The control circuitry 290 is communicatively coupled to the image memory 240 and can contain a processor 292. The control circuitry 290 controls the transfer of the data corresponding to the image obtained by the image sensor 220 to the image memory 240 and to the appropriate slot in the raw image queue 242. Upon pre-determined events, the control circuitry 290 may direct that some or all of the data contained in the image slot "Image 0" 244, image slot "Image 1" 246, up to an image slot "Image N" 248 be transferred to processing circuitry of the imaging system 200 for further processing.

It should be noted that the control circuitry 290 may also disable the transfer of image data obtained by the imaging system 200 from being delivered into the image memory 240. In this event, the image data would be transferred directly to image processing circuitry contained within the imaging system 200. As such, consecutive images may be stored in the raw image queue 242 while the image processing circuitry is currently busy with other processing functions.

Again, the functionality described in relation to FIG. 2 can be performed by a separate processor, or by equipment specific to a particular purpose. The use of a single processor provides the advantage of smaller circuitry and increased system and device integration. Conversely, multiple processors can operate simultaneously on different data.

Figure 3:
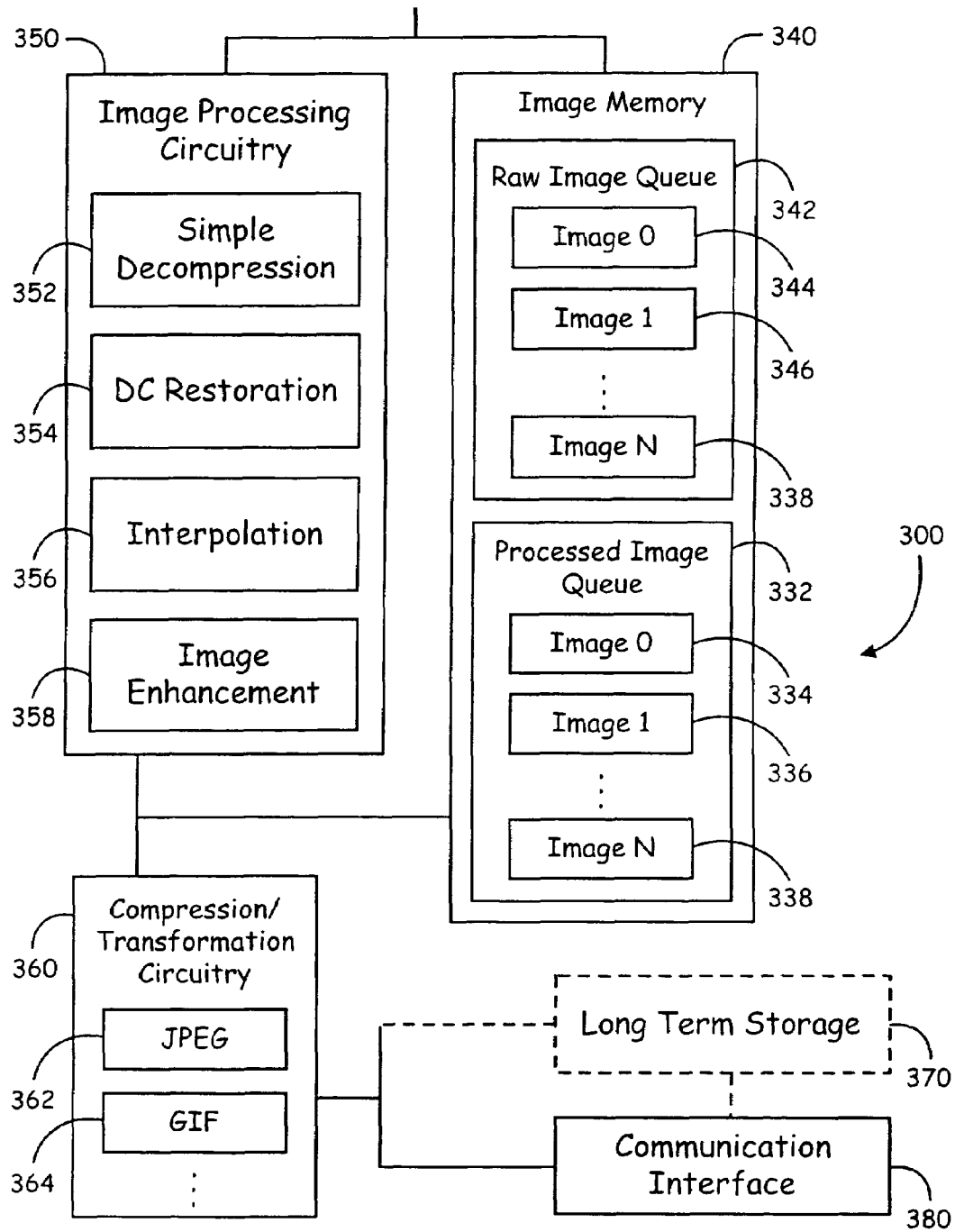
FIG. 3 is a schematic block diagram of an exemplary embodiment of the imaging processing circuitry, processed image queue, compression circuitry, long term storage, and the communication interface of FIG. 1.

FIG. 3 is a schematic block diagram of an exemplary embodiment of the imaging processing circuitry, processed image queue, compression circuitry, long term storage, and the communication interface of FIG. 1. In an imaging system 300, selected data is presented to an image processing circuit 350. This selected data may arise directly from an interface circuit as described above, or from a raw image queue. A control circuit 390 indicates to the image processing circuitry 350 whether previously collected data is available in a raw image queue 342 or whether the image processing circuitry 350 should take image data from an interface circuit (not shown). The data is presented to the image processing circuitry 350, which processes the raw image data.

The image processing circuitry 350 may typically contain several additional components, such as a simple decompression circuit 352, which decompresses the previously compressed data now presented by the interface circuitry (not shown). The image processing circuitry 350 may also contain a DC restoration circuit 354, which allows the image processing circuitry 350 to correct for biasing errors in the collection of the data from the image sensor (not shown), and from the image interface circuitry.

One method for determining the DC bias error is by detecting a portion of the image that should be completely black, and then by adjusting all pixels in the data set in the image such that this portion represents "true" black. Additional bias corrections may be made to the rest of the pixels on a proportional and relative basis.

The image processing circuitry 350 may contain a pixel defect correction circuit 357. Defect correction circuitry operates on particular pixel errors that result from inherent errors in individual light-detecting elements. Defect correction is well-known to those skilled in the art of digital imaging.

Similarly, a method of pixel defect correction involves covering the lensing system (not shown) and capturing a portion of the image that should be completely black. At this point, the pixels in the image processing circuitry should all indicate a "true" black. Any pixel elements that do not indicate true black are noted in the defect correction circuitry supplied to those particular pixels. An additional method is by detecting "spikes," that is, where individual pixel data deviate abnormally from the data for surrounding pixels and whereby the abnormal pixel data is adjusted accordingly relative to the surrounding normal pixels.

The image processing circuitry 350 may also contain an interpolation circuit 356. Interpolation of the raw image data involves the creation of pixel data by estimates based on known accurate pixel data. For example, an image having a pixel data arrangement using a Bayer pattern is commonly interpolated to obtain four times the existing resolution by determining a pixel value for each color component—red, green, and blue—for each portion of the image corresponding to each light detection element in the light sensor. For each portion of the image, one component—red, green, or blue—is known. The other components are then interpolated, that is, estimated based on the known surrounding elements. The resulting image may appear to be of higher quality to the casual observer because of the increased resolution. Nevertheless, the interpolation step results in a small amount of "smearing" of the pixels and the pixel data accuracy, in representing the original captured image, is somewhat degraded.

The image processing circuitry 350 may also contain an image enhancement circuit 358. This image enhancement circuitry 358 may perform other higher level imaging functions on the image data. This may include line sharpening, thereby counteracting the "smearing" effects caused by the interpolation circuitry 356. Or, the enhancement circuitry 358 may be used to filter of the image data, enhance the gray scale of the data, or other related functionality. Use of the image processing circuitry 350 may be time-consuming due to the number of imaging and processing steps in the circuitry.

The processed images may then be compressed or transformed to an alternative format. The internal data format for the imaging system 300 may be quite different from what the end user expected, or the processed images may need to be reduced in size due to transmission concerns.

The processed image is then transferred to a compression or transformation circuit 360. The compression or transformation circuitry 360 operates on the processed image data and outputs a compressed or transformed version of the processed image for later use. The possibilities for compression circuitry are numerous.

For example, the compression circuitry 360 may compress or transform the processed image into a "JPEG" image in a "JPEG" circuit 362. Or, the compression circuitry may compress or transform a processed image into a "GIF" image using a "GIF" circuit 364.

The compression or transformation circuitry 360 may employ processes that are very complex and time consuming. These processes can compress an image data file by a factor of 50 to 60, or greater. As such, the compression or transformation circuitry 360 may take longer to perform the compression and/or transformation of processed image data than the image processing circuitry 350 takes to process the image data.

For example, when initial image data is presented to the compression or transformation circuitry 360, the compression circuitry 360 begins to perform the compression or transformation steps on the processed image data. Meanwhile, the image processing circuitry 350 processes another image. The imaging system 300 detects that the image processing circuitry has a completed processed image ready for compression, but the compression or transformation circuitry 360 is not available to perform the steps on the processed image data. In this instance, the imaging system 300 stores the pending processed image data from the image processing circuitry 350 to an image memory 340.

The image memory 340 contains a processed image queue 332. The processed image data from the image processing circuitry 350 is directed to the processed image queue 332. If the control circuitry directs that the images are directed into the image memory 340, the image data is stored in a processed image queue 332. Additionally, the data corresponding to images collected by the imager 300 are placed into image slots "Image 0" 334, "Image 1" 336 through image slot "Image N" 338, in a manner substantially similar as that described in relation to FIG. 2.

When the compression circuitry completes its transformation of the prior processed image data, it sends the final image data to either a long term storage device 370 or a communication interface 380. The imaging system 300 will direct the compression or transformation circuit to begin processing the image data stored at the processed image slot "Image 0" 334 into final image data. The compression circuitry 360 then retrieves the processed image data stored at the processed data slot "Image 0" 334, and commences its operations on the processed image data contained at that slot in the processed image queue 332.

Or, should the image processing circuitry 350 finish another processed image prior to the compression or transformation circuitry 360 completing the processing of its initial image data, the imaging system 300 would detect this condition and direct the image processing circuitry to deliver the new processed image data to a processed image slot "Image 1" in the processed image queue 332. Thus, multiple processed image data sets may be stored in the processed image queue 332 for later processing by the compression or transformation circuitry 360.

A control circuit can control the functions of the imaging system 300 in this instance. The control circuitry would detect any overflow conditions between the image processing circuitry 350 and the compression or transformation circuitry 360, would detect when the compression or transformation circuitry 360 has compressed or transformed the image data, and would control the ordering of the processed image data to and from the appropriate slots "Image 0" 334, "Image 1" 326 and so on, in the processed image queue 332.

It should be noted that an additional intermediate storage buffer can operate on the transformation/compression circuit—communication circuit interface as well. The operation of such an intermediate data buffer would be substantially similar as that in relation to the processing circuit-compression/transformation circuit interface described above.

Figure 4:
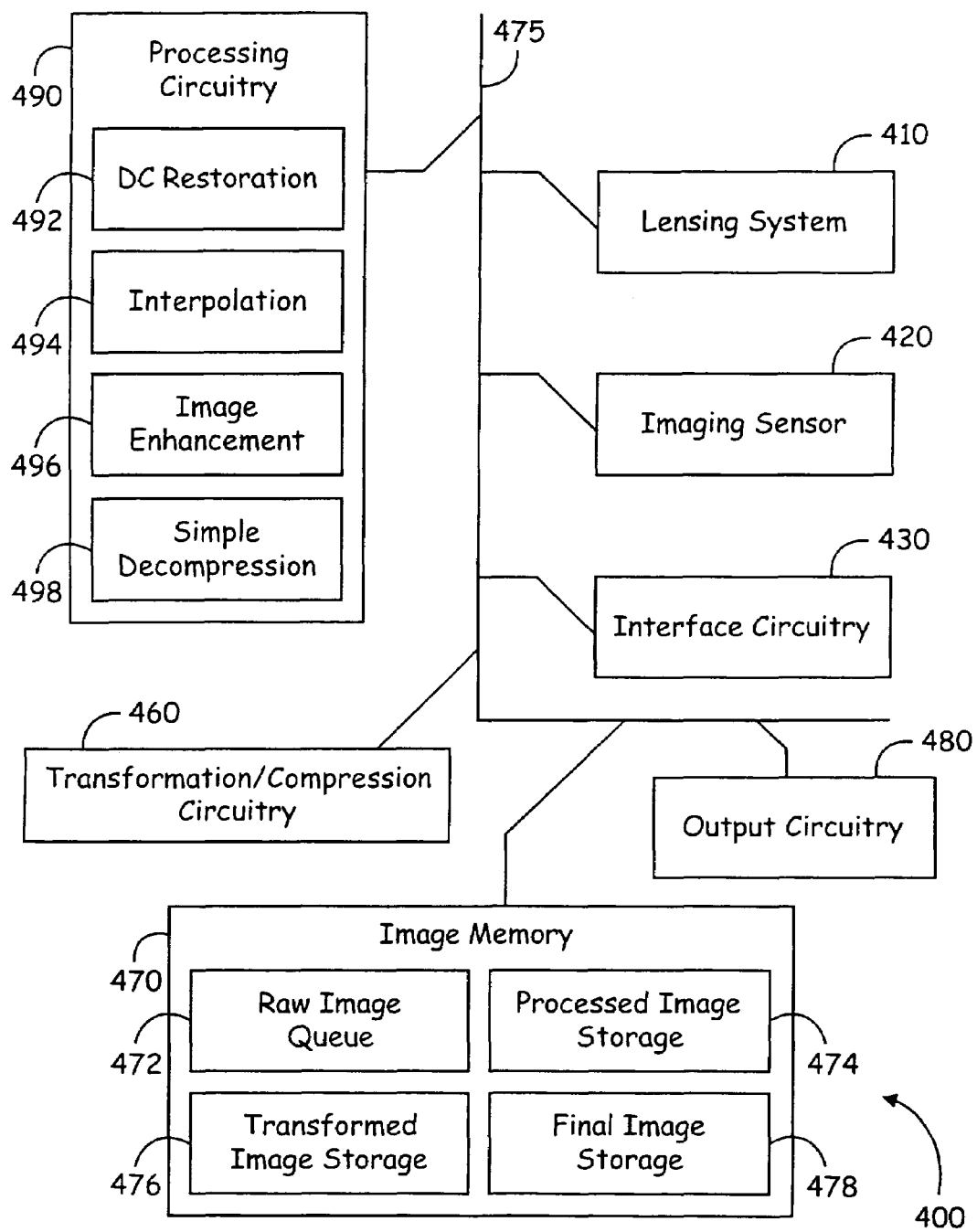
FIG. 4 is a schematic block diagram of an exemplary embodiment of the imaging processing circuitry, lensing system, imaging sensor, interface circuitry, image memory, compression or transformation circuitry, and the output circuitry FIG. 1.

FIG. 4 is a schematic block diagram of an exemplary embodiment of the imaging processing circuitry, lensing system, imaging sensor, interface circuitry, image memory, compression or transformation circuitry, and the output circuitry of FIG. 1. An imaging system 400 contains the functional imaging systems of: a lensing system 410, an imaging sensor 420, an interface circuit 430, a compression or transformation circuit 460, a processing circuit 490, an output circuit 480. The imaging system 400 also contains an image memory 470.

The lensing system 410, the imaging sensor 420, the interface circuitry 430, the processing circuitry 490, and the compression or transformation circuitry 460 can all contain the functionality described in the preceding Figures. The image memory 470 is a monolithic block of memory connecting the circuitry of the imaging system 400 through a bus or other connection 475. The image memory 470 contains a raw image queue 472, a processed image queue 474, and may contain other stored information such as data structures or software to implement functionality as described herein.

The image memory 470 does not need to be a single monolithic memory, as the individual components of the image memory 470 may be distributed among several independent memories. This may lead to greater efficiency in the imaging system 400.

For example, an image memory may be shared by the interface circuitry 430 and the processing circuitry 490. Since a direct connection would exist between the interface circuitry 430 and the processing circuitry 490, no bus access would be necessary for the pipeline between the interface circuitry 430 and the processing circuitry 490. Correspondingly, a block of memory may be shared between the processing circuitry 490 and the compressing or transformation circuitry 460. Again, this would save time because a direct connection between that circuitry would be enabled and no bus access would be needed.

Figure 5:
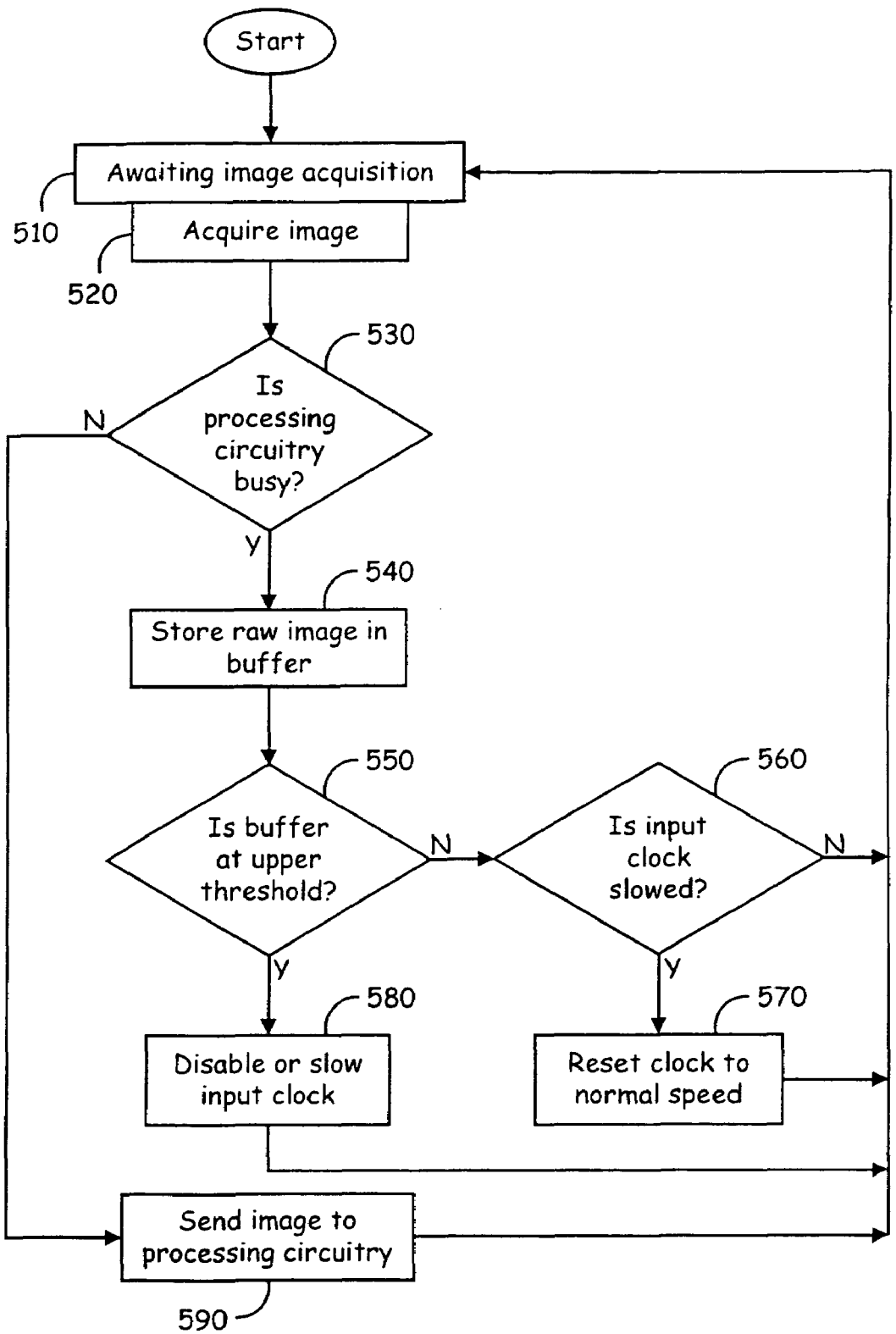
FIG. 5 is a flow diagram describing a possible implementation of the imaging system of FIG. 1.

FIG. 5 is a flow diagram describing a possible implementation of the imaging system of FIG. 1. In a block 510, the imaging system awaits an image acquisition. Upon the acquisition of an image in a block 520, the imaging system determines if the processing circuitry of the imaging system is busy in a block 530.

If the processing circuitry of the imaging system is busy, the imaging system then directs that the raw image be stored in a raw image queue in a block 540. At this point, in a block 550, the imaging system then determines whether the additional raw image information would cause the amount of image data in the buffer to exceed a preset threshold in a block 550.

If the amount of data in the buffer exceeds this threshold, then the imaging system disables or slows the clocking of the interface circuitry in a block 580. Thus, the imaging system provides adaptive clocking of the actual acquisition system based upon the processing schedule of the imaging system.

If in the block 550, it is determined that the data in raw image buffer is below this specified threshold, then the imaging system then determines whether the clocking of the acquisition systems has already been slowed in a block 560.

If the clocking of the acquisition circuitry has previously been slowed or disabled in the imaging system, then in a block 570 the imaging system resets the clock of the acquisition systems to normal. This allows the faster acquisition of images into the imaging system as there is no timing bottleneck between the acquisition systems and the processing circuitry of the imaging system as depicted.

If the processing circuitry is not busy in the block 530, then the imaging system presents the currently acquired images to the processing circuitry in a block 590. Then it returns to await another image acquisition in the block 510.

It should be noted that the use of intermediate image buffers may be used in many situation in the imaging system. For example, a methodology of operation substantially similar to that described may be employed in the interface between the image processing circuitry and the compression/transformation circuitry. Relatedly, a substantially similar method may be used in the interface between the compression/transformation circuitry and the communication circuitry of an imaging system.

Figure 6:
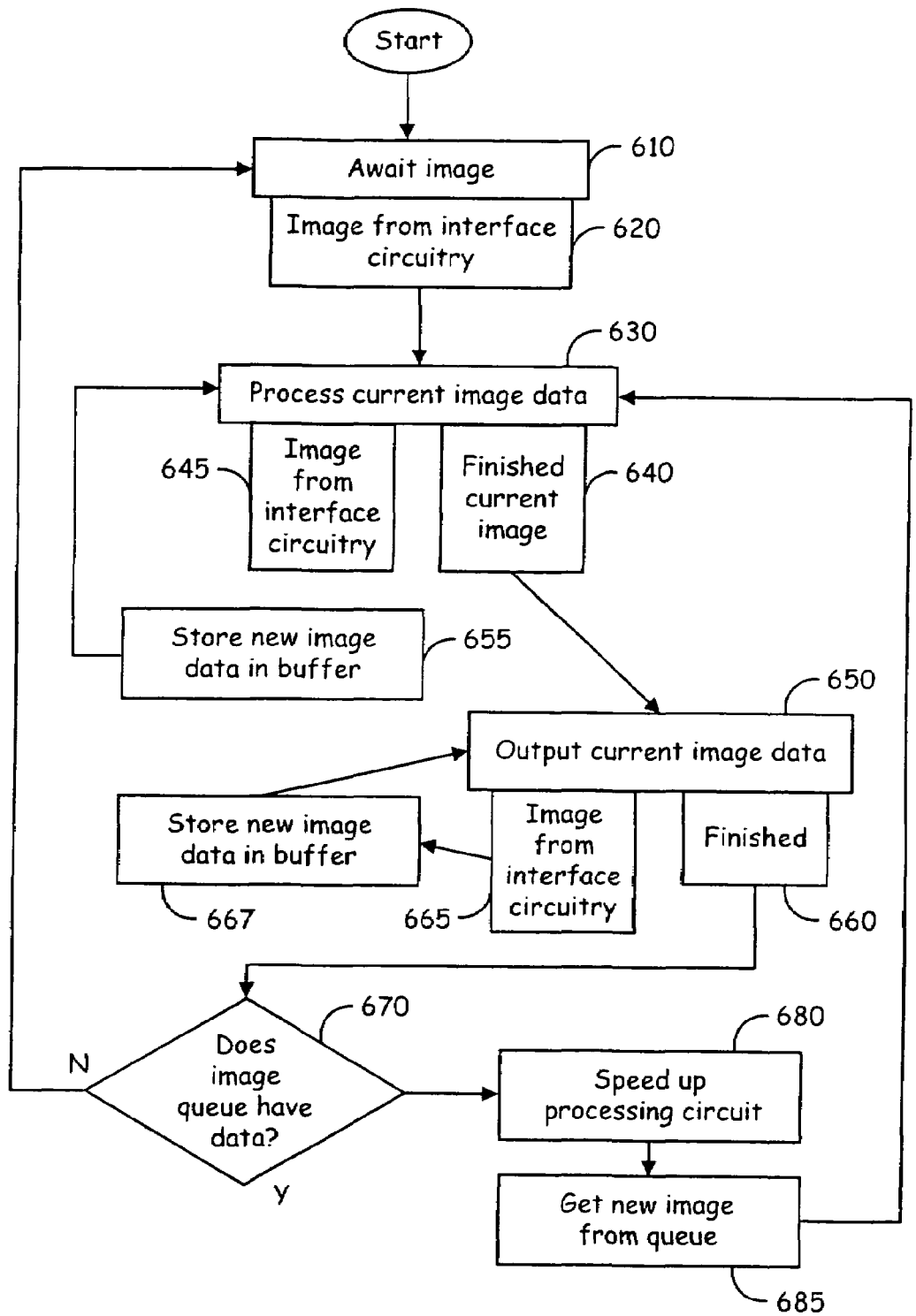
FIG. 6 is a flow diagram detailing the possible operation of an embodiment of the invention according to FIG. 1.

FIG. 6 is a flow diagram detailing the possible operation of an embodiment of the imager of FIG. 1. Here, the interface between the functional processing systems is adaptively clocked through the use of an intermediate storage buffer.

The imaging system awaits the acquisition of an image in a block 610. In a block 620, the image has been acquired and presented to the interface circuitry. The processing circuitry takes the image from the interface circuitry and begins to process the current image data in a block 630.

In a block 645, the image processing circuitry receives a signal that another image is available from the image interface circuitry. Control transfers to a block 655, in which the imaging system stores the newer image in the raw image buffer. The image processing circuitry continues to process the current image in the block 630. Subsequent images from the interface circuitry are consecutively stored in the raw image buffer as they become available.

In a block 640, the processing circuitry has finished processing the current image data. In a block 650, the processing circuitry then presents the current processed image data to either device output or to a further compression or transformation circuit. If during the transfer of the current processed image to either device output or to the transformation or compression circuit, the imaging system indicates that an image is available from the interface circuitry, the imaging system directs the image to be transferred to the processing circuitry in a block 665.

In a block 667, the imaging system buffers the new image data from the interface circuitry. The processing circuit continues to process the current raw image data in the block 650.

If the new image from the interface circuitry can be processed immediately, the image is transferred to the processing circuitry in a block 669, and the processing circuitry begins to process this data in the block 630.

In a block 660, the processing circuitry has output the processed image data to the compression or transformation circuitry. Control then flows to a block 670, in which the imaging system determines whether the raw image queue contains data.

If no data is present in the raw image queue, the imaging system returns to the block 610 to await a new image. If the raw data buffer contains an image, then the imaging system speeds up the processing circuit in a block 680. Next, the imaging system retrieves an image from the raw data queue and directs the processing circuitry to process the image taken from the raw image data queue in the block 685, where it is processed in the block 630.

It should be noted that the use of intermediate image buffers may be used in many situation in the imaging system. For example, a methodology of operation substantially similar to that described may be employed in the interface between the image processing circuitry and the compression/transformation circuitry. Relatedly, a substantially similar method may be used in the interface between the compression/transformation circuitry and the communication circuitry of an imaging system.

FIG. 7a is a schematic block diagram of a possible implementation of an image processing circuitry of FIG. 1. An image processing circuit 710 contains multiple examples of image processing circuitry "Processing Circuitry 1" 720a, "Processing Circuitry 2" 720b, to "Processing Circuitry N" 720n, respectively. Thus, this embodiment may contain an indefinite number of instances of processing circuitry. The plurality of processing circuitry allows for the enabling of additional processing circuitry as the imaging system acquires increasing numbers of images.

For example, a lightly used imaging system may require the enabling of "Processing Circuitry 1" 720a, but, if overloaded, can enable additional processing circuitry. And, when such overload conditions are no longer present, the image processing circuitry may dynamically disable unnecessary circuitry at that time. It should be noted that the individual processors 720a–n may also represent differently clocked processing units. Or, the individual processors 720a–n may also represent the same processing unit with a different clocking enabled.

FIG. 7b is a schematic block diagram of a possible implementation of a compression/transformation circuitry of FIG. 1. A compression/transformation circuit 711 contains multiple examples of compression/transformation circuitry "Compression/Transformation Circuitry 1" 721a; "Compression/Transformation 2" 721b, to "Compression/Transformation N" 721n, respectively. Thus, this embodiment may contain an indefinite number of instances of compression/transformation circuitry. The plurality of compression/transformation circuitry allows for the enabling of additional compression/transformation circuitry as the imaging system acquires increasing numbers of Images.

For example, a lightly used imaging system may require the enabling of "Compression/Transformation Circuitry 1" 721a, but, if overloaded, can enable additional compression/ transformation circuitry. And, when such overload conditions are no longer present, the imaging system may dynamically disable unnecessary circuitry at that time. It should be noted that the individual processors 721a–n may also represent differently clocked circuits. Or, the individual circuits 721a–n may also represent the same circuit with a different clocking enabled.

Figure 8:
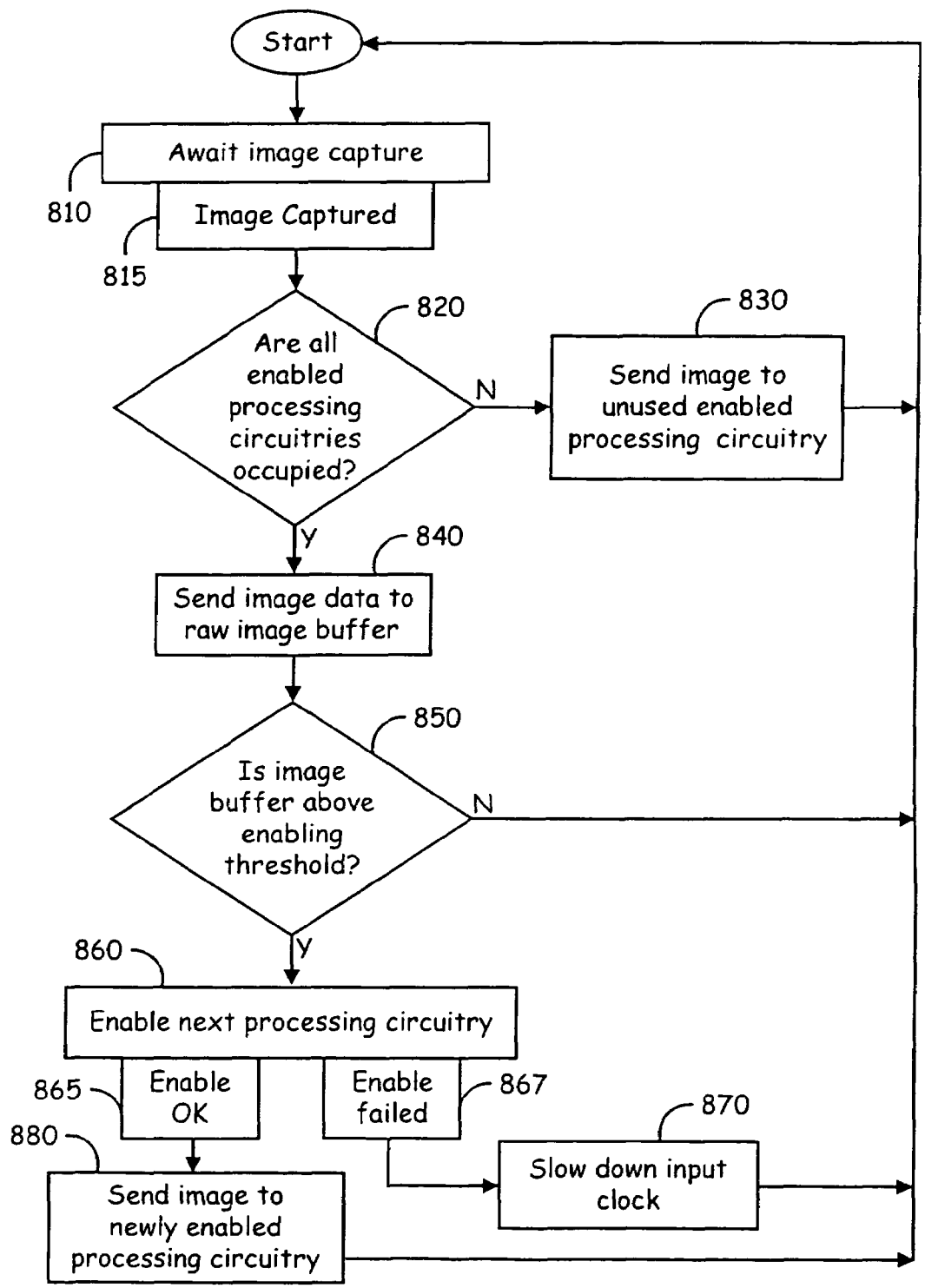
FIG. 8 is a flow diagram of the possible implementation of a multi-processor or multi-processing circuitry system according to FIG. 7.

FIG. 8 is a flow diagram of the possible implementation of a multi-processor or multi-processing circuitry system of FIG. 7. In a block 810, the imaging system awaits the acquisition of an image. In a block 815, the image has been captured. In a block 820, the imaging system determines whether all enabled processing circuitry is occupied. If not, the image is sent to an unused but enabled processing circuit in a block 830. The imaging system then awaits another image to capture in block 810.

If all enabled processing circuitries are occupied, then the imaging system sends the image data to a raw image queue in a block 840. In a block 850, the imaging system then determines if the amount of image data in the raw image queue is above an enabling threshold. If not, the imaging system simply awaits capture of another image in the block 810.

If the image buffer indicates that the imaging system should enable another processor, then in a block 860 the imaging system attempts to enable an additional processing circuit. If the enable fails in a block 867, the imaging system directs the acquisition systems of the lensing system, the imaging circuitry and the interface circuitry to slow down the input clock in a block 870. Similarly, if the raw image buffer is above an additional critical threshold, the imaging system may entirely disable an input clock to the acquisition systems.

If the imaging system can enable another processor in a block 865, the imaging system sends the new image to the newly enabled processing circuitry in a block 880. The imaging system returns to await another image capture in a block 810.

Figure 9:
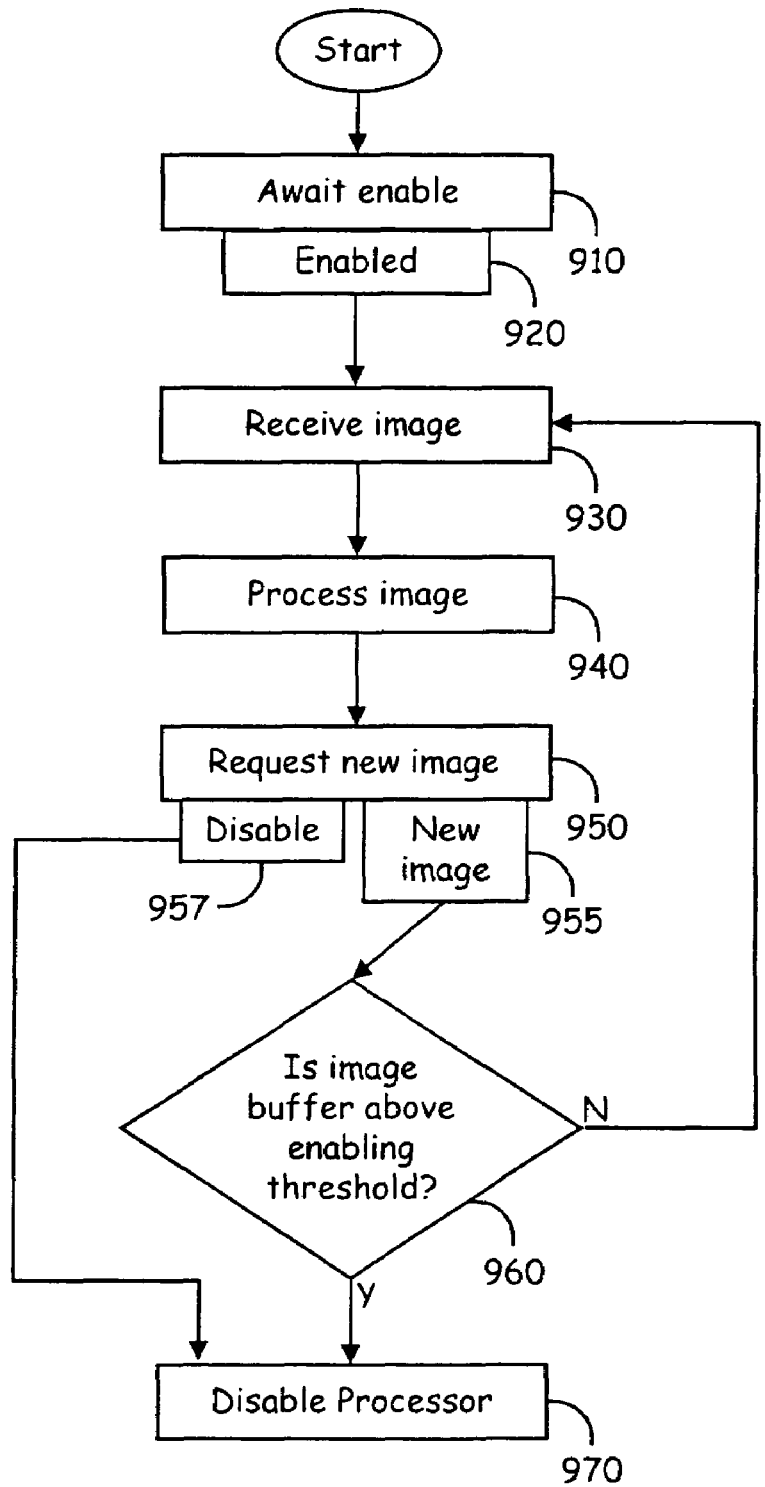
FIG. 9 is a flow diagram describing another embodiment of the operation of the multiple processing circuitry according to FIG. 7.

FIG. 9 is a flow diagram describing another embodiment of the operation of the multiple processing circuitry of FIG. 7. In a block 910, an individual processing circuit awaits enabling by the imaging system. In a block 920, an individual processing circuit has been enabled by the imaging system. The individual processing circuitry then awaits the reception of an image from the imaging system in a block 930. In a block 935, the individual processor has received an image to be processed from an interface circuit.

This image is processed in a block 940. Upon completion of processing the image in the block 940, the individual processing circuitry then requests a new image in a block 950.

If there is not enough data present in the raw image data queue to warrant the activation of the current processing circuitry, the imaging system can request a disabling of the processor in a block 957. The processor is disabled in a block 970, and returns to the idle state in the block 910.

The imaging system may send an image to the processor in a block 955. If there is enough data in the raw image data queue to warrant continuing operation of the given processor, control returns to the block 930 where the individual processor awaits the receipt of another image.

Figure 10:
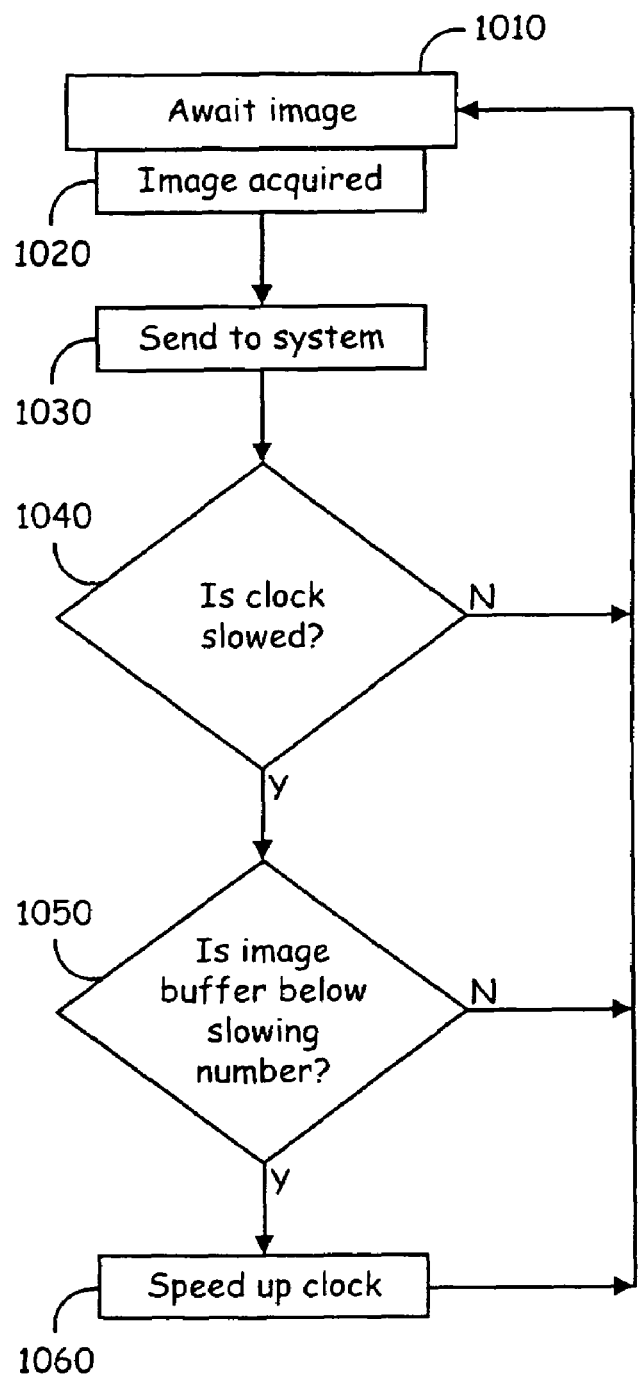
FIG. 10 is a flow diagram relating to the multi-processing circuitry according to FIG. 7.

FIG. 10 is a flow diagram relating to the multi-processing circuitry system of FIG. 7. In this case, an imaging system needs to determine the clocking of the acquisition portion of the imaging system, that is, the lensing system, the image sensor circuitry and the interface circuitry.

In a block 1010, the imaging system awaits the acquisition of an image. In a block 1020, an image has been acquired, and control passes to a block 1030, in which the image is sent to the imaging system for either buffering in a raw image data queue or to processing circuitry. In a block 1040, the imaging system determines whether the clocking of the acquisition systems has previously been slowed. If it has not, the imaging system simply returns to the block 1010 to await another image.

If the clocking of the acquisition systems has been slowed, then in a block 1050, the imaging system determines whether the raw image data queue is in a condition where the speed of the acquisition system clocking may be increased. If the amount of raw image data in the raw image data queue is not below this threshold, the clock remains slowed and the imaging system returns to the awaiting image state depicted in block 1010. If the amount of raw image data in the raw image data queue is below this threshold, the imaging system then accelerates the clocking of the acquisition system in a block 1060. Control again returns to the block 1010 where the imaging system awaits another image.

Multiple thresholds may be used in this embodiment and multiple clock speeds may be used with these multiple thresholds. For example, if a first threshold is met, the imaging system determines that the acquisition clock should be decreased by some factor. If the imaging system then determines that another threshold has been exceeded, it may further decrease the speed of the image acquisition clock by another factor.

The imaging system may also use multiple thresholds to increase clock speed, based on multiple thresholds being met in the amount of data present in the raw image data queue. Similar multitudes of threshold levels may be specified for all components of the imaging system that periodically store or buffer image data, including the image processing circuitry, the image memory and the compression or transformation circuitry, for example.

Figure 11A:
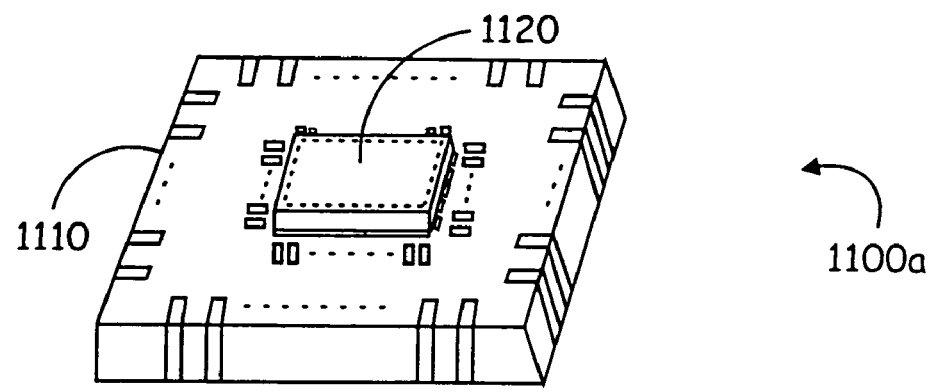
FIG. 11a is a perspective view of an embodiment of the imaging system of FIG. 1 implemented in a single chip format.

FIG. 11a is a perspective view of an embodiment of the imager of FIG. 1 implemented in a single chip format. An imaging system 1100a may be implemented by mounting a single chip 1120 on a die 1110. The single chip 1120 is typically a hybrid chip in that it contains analog and digital functionality.

Figure 11B:
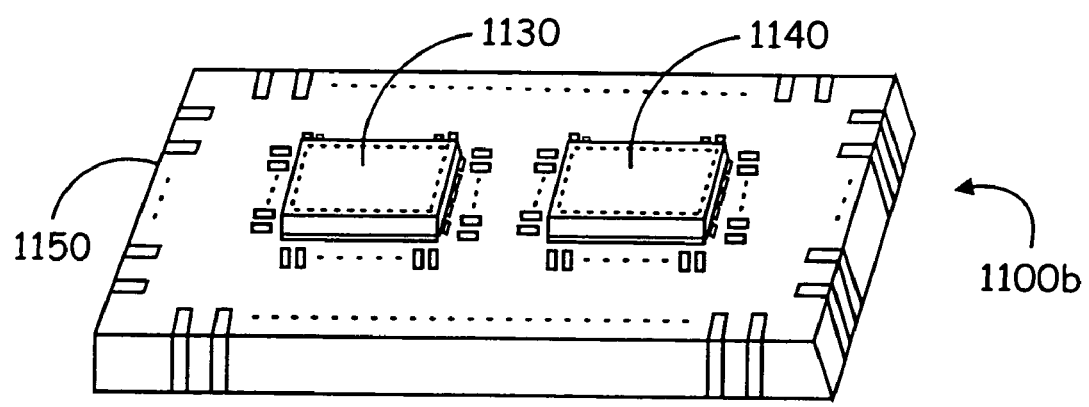
FIG. 11b is a perspective view of an embodiment of the imaging system of FIG. 1 implemented in a two-chip format.

FIG. 11b is a perspective view of an embodiment of the imager of FIG. 1 implemented in a two-chip format. Conversely, an imaging system 1100b may be implemented by mounting a first chip 1130 and a second chip 1140 on a die 1150. Here, one of the chips, for example, the first chip 1130 would contain analog functionality, while the second chip 1140 would contain digital functionality. Or, the chips may both be hybrid in nature. The implementation of either chip with analog or digital functionality is interchangeable.

While various embodiments of the invention have been described, it will be apparent to those of ordinary skill in the art that many more embodiments and implementations are possible that are within the scope of this invention.

What is claimed is:

1. An imaging system comprising:
   an image capture circuit;
   image processing circuitry, coupled to the image capture circuit, that is operable at a first rate and a second rate;
   the image processing circuitry operating at the first rate to perform a first stage of image processing;
   an intermediate storage queue, communicatively coupled to the image processing circuitry, that stores representations of a plurality of images having undergone the first stage of image processing in anticipation of the second stage of image processing;

the image processing circuit operating at the second rate to perform a second stage of image processing; and at least one of the first rate and the second rate being adjustable.

2. The imaging system of claim 1 wherein the second rate is adjusted based on the content of the intermediate storage queue.

3. The imaging system of claim 1 wherein the first rate is adjusted based on the content of the intermediate storage queue.

4. The imaging system of claim 1 wherein the second rate is adjusted down when the intermediate storage queue contains less than a predetermined amount of image data.

5. The imaging system of claim 1 wherein the first rate is adjusted to zero when the intermediate storage queue is at least almost full.

6. The imaging system of claim 1 wherein the second rate is adjusted to a maximum rate when the intermediate storage queue is at least almost full.

7. The imaging system of claim 1 wherein the first rate is adjusted to a low rate when the intermediate storage queue contains more than a predetermined amount of image data.

8. The imaging system of claim 1 wherein the second rate is adjusted to a high rate when the intermediate storage queue contains more than a predetermined amount of image data.

9. An electronic imager, the electronic imager performing processing on an acquired image, the electronic imager comprising:

a plurality of functional processing circuits, the functional processing circuits comprising:

an acquisition circuit that produces signals in response to incident light from an acquired image;

an interface circuit, communicatively coupled to the acquisition circuit, that produces a raw image data set from the signals collected by the acquisition circuit;

a processing circuit that produces a processed image data set from the raw image set; and an intermediate image storage buffer, communicatively coupled to the processing circuit, that stores one or more image data sets in anticipation of at least one additional stage of image processing; and one or more of the plurality of functional processing circuits altering its particular operational speed in response to the amount of image data sets contained in the intermediate storage buffer.

10. The electronic imager of claim 9, wherein the intermediate storage buffer stores raw image data sets.

11. The electronic imager of claim 10 wherein the processing circuit slows when the amount of raw image data sets exceeds a predetermined threshold.

12. The electronic imager of claim 10 wherein the processing circuit speeds up when the amount of raw image data sets is below a predetermined threshold.

13. The electronic imager of claim 10 wherein the acquisition circuit slows when the amount of raw image data sets exceeds a predetermined threshold.

14. The electronic imager of claim 9, the functional processing circuits further comprising a transformation circuitry, communicatively coupled to the processing circuitry, that produces a final data image set from a processed data image set.

15. The electronic imager of claim 14 wherein the intermediate storage buffer stores processed image data sets.

16. The electronic imager of claim 15 wherein the processing circuit slows when the amount of processed image data sets exceeds a predetermined threshold.

17. The electronic imager of claim 15 wherein the processing circuit speeds up when the amount of processed image data sets is below a predetermined threshold.

18. A method of operating an imaging system, the imaging system comprising functional imaging circuits, the functional image circuits comprising an image sensor, an interface circuit, and an image processing circuit, the method comprising the steps of:

acquiring an initial image from the image sensor;

producing a first image data from the initial image in the interface circuit;

processing the first image data into a second image data in the image processing circuit;

selectively storing either the first image data or the second image data in a buffer in anticipation of at least one additional stage of image processing; and selectively altering the speed at which one of the functional imaging circuits operates in response to the amount of image data in the buffer.

19. The method of claim 18, the functional imaging circuits further comprising a transformation circuit, the method further comprising the step of:

processing the second image data into a final image data in the transformation circuit.

20. The method of claim 19 wherein the step of selectively altering further comprises the step of speeding up the transformation circuit when the buffer contains more than a predetermined amount of processed image data.

21. The method of claim 19 wherein the step of selectively altering further comprises the step of slowing down the transformation circuit when the buffer contains less than a predetermined amount of processed image data.

22. The method of claim 19 wherein the step of selectively altering further comprises the step of slowing down the processing circuit when the buffer contains more than a predetermined amount of processed image data.

23. The method of claim 18 wherein the step of selectively altering further comprises the step of slowing down the processing circuit when the buffer contains less than a predetermined amount of raw image data.

24. The method of claim 18 wherein the step of selectively altering further comprises the step of speeding up the processing circuit when the buffer contains more than a predetermined amount of raw image data.

25. The method of claim 18 wherein the step of selectively altering further comprises the step of slowing down the interface circuit when the buffer contains more than a predetermined amount of raw image data.

26. The method of claim 18 wherein the step of selectively altering further comprises the step of slowing down the image sensor when the buffer contains more than a predetermined amount of raw image data.

* * * * *